US008000002B2

(12) United States Patent
Brauneck et al.

(10) Patent No.: US 8,000,002 B2
(45) Date of Patent: Aug. 16, 2011

(54) INTERFERENCE FILTER AND METHOD FOR PRODUCING IT

(75) Inventors: Ulf Brauneck, Gross-Umstadt (DE); Ulrich Jeschkowski, Mainz (DE); Thomas Strohmaier, Mainz (DE); Wolfgang Erbach, Guldental (DE)

(73) Assignee: Schott AG (DE)

( * ) Notice: Subject to any disclaimer, the term of this patent is extended or adjusted under 35 U.S.C. 154(b) by 538 days.

(21) Appl. No.: 12/129,071

(22) Filed: May 29, 2008

(65) Prior Publication Data

US 2008/0297886 A1 Dec. 4, 2008

(30) Foreign Application Priority Data

May 31, 2007 (DE) .................. 10 2007 025 600

(51) Int. Cl.
*F21V 9/06* (2006.01)
(52) U.S. Cl. ........ 359/359; 359/361; 359/586; 359/588; 359/589; 359/900; 427/162
(58) Field of Classification Search .................. 359/359, 359/361, 580, 586, 588, 589, 900; 427/162, 427/166
See application file for complete search history.

(56) References Cited

U.S. PATENT DOCUMENTS

| 4,045,125 A | 8/1977 | Farges |
| 4,934,788 A | 6/1990 | Southwell |
| 5,400,179 A * | 3/1995 | Ito .................. 359/588 |
| 6,473,227 B1 * | 10/2002 | Yamagata .................. 359/361 |
| 6,569,529 B1 * | 5/2003 | Phillips et al. .................. 428/403 |
| 6,590,702 B1 | 7/2003 | Shirai |
| 7,095,009 B2 * | 8/2006 | Harada et al. .................. 250/226 |
| 2002/0044287 A1 * | 4/2002 | Otaki .................. 356/521 |
| 2007/0053055 A1 * | 3/2007 | Mikami et al. .................. 359/359 |

FOREIGN PATENT DOCUMENTS

| CN | 1688659 A | 10/2005 |
| DE | 1113837 A | 9/1961 |
| DE | 102 13 088 B4 | 3/2005 |
| EP | 1498259 A1 | 1/2005 |
| EP | 1705512 A1 | 9/2006 |
| JP | 2004-264611 A | 9/2004 |
| WO | 0231058 A1 | 4/2002 |

OTHER PUBLICATIONS

Elmer Ritter, "Optical film materials and their applications", Applied Optics, vol. 15, No. 10, Oct. 1976, 2318-2327.*
Z. Les, "Broadband semitransparent dielectric reflectors with dispersion and absorption: design", Applied Optics, vol. 20, No. 1, Jan. 1, 1981, pp. 61-65.*

(Continued)

*Primary Examiner* — Frank Font
(74) *Attorney, Agent, or Firm* — DeMont & Breyer LLC

(57) ABSTRACT

The invention is based on the object of providing UV interference filters having improved long-term stability. For this purpose, a method for producing a dielectric transmission interference filter is provided, in which an alternating layer system having the constituents magnesium fluoride, lead fluoride and antimony oxide is produced on a substrate by co-evaporation. After deposition, the substrate is subjected to heat treatment and irradiated with UV light in order to stabilize the layer system.

14 Claims, 4 Drawing Sheets

OTHER PUBLICATIONS

Yu A Golberg, "Semiconductor near-ultraviolet photoelectronics", Semicond. Sci. Technol. 14, 1999, pp. R41-R60.*

Jia Peijun, "Chinese Office Action for International Application 200810176971.6", May 6, 2010, Publisher: State Intellectual Property Office of the People's Republic of Chine, Published in: CN.

Christophe Denise, "EP Patent Application No. EP 08 00 9526 International Search Report", Oct. 7, 2008, Publisher: EPO, Published in: EP.

Examiner: Christophe Denise, "European Office Action for European International Application No. 08009526.8", Nov. 26, 2010, Publisher: European Patent Office, Published in: EP.

* cited by examiner

INTERFERENCE FILTER AND METHOD FOR PRODUCING IT

FIELD OF THE INVENTION

The invention relates generally to interference filters. In particular, the invention relates to interference filters for UV lithography.

BACKGROUND OF THE INVENTION

One area of use for high-quality UV interference filters is in lithography in the production of semiconductor components, inter alia. By way of example, interference filters are used in so-called steppers in order to filter out as far as possible monochromatic light from the spectrum of the vapor lamps that are usually used. In a stepper, a wafer, or the applied photoresist, is exposed stepwise via a mask projected onto the wafer in demagnified fashion.

In many cases the i-line of the mercury of a mercury vapor lamp is used for this purpose. Particular requirements arise here in respect of the filter for filtering out this light. At shorter wavelengths, the tolerances in the optical thickness of the interference layers also decrease correspondingly. The tolerances have to be complied with not just in the case of a newly incorporated filter; stringent requirements are made of long-term stability, too. Here neither the transmission nor the position of the edges of the transmission window or windows should change over a relatively long time.

SUMMARY OF THE INVENTION

Therefore, the invention is based on the object of providing UV interference filters having improved long-term stability.

Accordingly, a method for producing a dielectric transmission interference filter is provided, in which a substrate is disposed in an evaporation chamber and layers having a higher refractive index and a lower refractive index are alternately deposited on the substrate, wherein the layers are in case produced by co-evaporation of at least two of the constituents magnesium fluoride, lead fluoride and antimony oxide, wherein the layers having a high and a low refractive index have different compositions. The substrate coated in this way, after the deposition of the layers, is then subjected to heat treatment at a temperature of at least 50° C. and is irradiated with UV light. In the process there is a decrease in the central wavelength of the transmission window in the transmission of the filter for the central transmission wavelength within a spectral transmission window in the course of the irradiation.

In the case of a transmission filter it is expedient here, of course, to select a substrate which is transparent in the transmission window of the layer system.

In other words, the method according to the invention consists in depositing, for producing a dielectric interference filter in an evaporation chamber, layers having a higher refractive index and a lower refractive index alternately on a substrate, wherein an alternating layer system is deposited which has alternate first and second layers having a different composition of the constituents magnesium fluoride, lead fluoride and antimony oxide, wherein, after coating, the central wavelength of a transmission or reflection window is shifted toward shorter wavelengths in the direction of the design wavelength by virtue of the coated substrate being subjected to heat treatment and being irradiated with UV light. The shift toward shorter wavelengths is caused by an increase in the refractive index of the relevant layers. The increase in the refractive index is generally also accompanied by an albeit very small widening of the transmission window.

Accordingly, what is obtained as a result of the coating is an intermediate product for producing a dielectric UV interference filter, comprising a substrate and, deposited thereon, an alternating layer system having alternate first and second layers, wherein the first layers and the second layers contain a mutually different composition of the constituents antimony oxide, lead fluoride and magnesium fluoride, wherein the layer thicknesses of the layers are a multiple of a quarter of a design wavelength $\lambda$, and wherein, by means of heat treatment and/or UV irradiation, it is possible to obtain a shift in the central wavelength of a transmission or reflection window in the direction of the design wavelength proceeding from a longer wavelength than the design wavelength.

In particular layers having a lower refractive index are produced by co-evaporation of magnesium fluoride and lead fluoride and layers having a higher refractive index are produced by co-evaporation of lead fluoride and antimony oxide, such that the layers having a lower refractive index contain a mixture of magnesium fluoride and lead fluoride and the layers having a higher refractive index contain a mixture of lead fluoride and antimony oxide. As an alternative, it is also possible for the deposition of the layers having a lower refractive index to comprise the evaporation of magnesium fluoride and antimony oxide and the deposition of the layers having a higher refractive index to comprise the evaporation of lead fluoride and antimony oxide, such that the layers having a lower refractive index contain a mixture of magnesium fluoride and antimony oxide and the layers having a higher refractive index contain a mixture of lead fluoride and antimony oxide.

Within the meaning of the invention, central wavelength is understood to be the average wavelength of the plateau in the case of a plateau-shaped transmission maximum, otherwise the wavelength of the maximum transmission within the window.

The irradiation can be effected before, during or after the heat treatment. An irradiation after the heat treatment is preferred.

It is surprising in this case that, after the heat treatment and in particular after the UV irradiation, the central wavelength then remains stable for a long time, such that the filter has a significantly increased lifetime in comparison with other dielectric transmission filters for the UV range.

According to the current level of knowledge, using various analytical methods, practically no differences in the layer system before and after the UV irradiation can be established per se. The morphology of the layers appears to be unchanged for example when a break edge is viewed with a scanning electron microscope.

It is assumed that the effect is based primarily on a change in the composition of the layers. $MgF_2$ and in particular $PbF_2$ dissociate during vapor deposition and recombine during deposition. In this case, incomplete recombination can then occur since fluorine is more readily volatile, such that substochiometric layers are obtained.

The UV irradiation evidently brings about here a post-loading with oxygen, for instance on account of UV-excited oxygen migration, which then leads to a change in the optical density of the layers here, on the one hand, and chemical stabilization, on the other hand. If a heat treatment and UV treatment are not carried out after the coating, water may possibly be incorporated at the oxygen defects, which then permanently prevents chemical stabilization.

A UV transmission filter is understood to be, in particular, such a filter in which the layer thicknesses of the layers are coordinated such that the transmission window has, after the UV irradiation, a spectral position whose longer-wave edge lies at a wavelength of less than 450 nanometers. The particularly preferred application of the invention is in the production of a transmission filter for the i-line of mercury in order to use the filter in an exposure device for semiconductor lithography. Accordingly, for this purpose the layer thickness of the layers of the coating is chosen such that the transmission window includes a wavelength of 365 nanometers in particular after the irradiation with UV light.

A good narrowband nature is generally required for line filters. Preferably, therefore, the layer system or the number and layer thickness of the layers are chosen such that the transmission maximum has a full width at half maximum of at most 20 nanometers, preferably at most 15 nanometers. Layer systems having a total of at least 15 layers, preferably at least 20 layers, are suitable for this purpose.

The irradiation with UV light for shifting and stabilizing the design wavelength is preferably performed for a duration of at least five hours, preferably for a duration of approximately 24 to 48 hours. In particular, a mercury vapor lamp or a lamp which likewise emits UV light at a wavelength of 365 nanometers is suitable as UV light source.

In general, a shift in the central wavelength of the transmission window toward shorter wavelengths by at least 0.1 nanometer, preferably at least 0.2 nanometer, is achieved by means of the irradiation and/or the heat treatment. Customary values are a shift in the range of 0.2 and 0.5 nanometers. In the case of the narrowband nature generally required, however, such a shift already leads to considerable transmission increases for lines of vapor lamps since the typical line widths also only lie in the range of a few nanometers.

The heat treatment is preferably carried out at moderate temperatures of less than 250° C. The duration of the heat treatment is furthermore preferably at least twelve hours. By way of example, a heat treatment of 24 hours at 100° C. has proved to be suitable.

In a particularly advantageous manner, large-area long-term-stable filters can also be produced by means of the method. Thus, a substrate area having a lateral dimension or a diameter of at least 100 millimeters can be coated and aftertreated according to the invention.

BRIEF DESCRIPTION OF THE DRAWINGS

The invention is explained in more detail below with reference to the accompanying drawings, in which.

DETAILED DESCRIPTION

Figure 1:
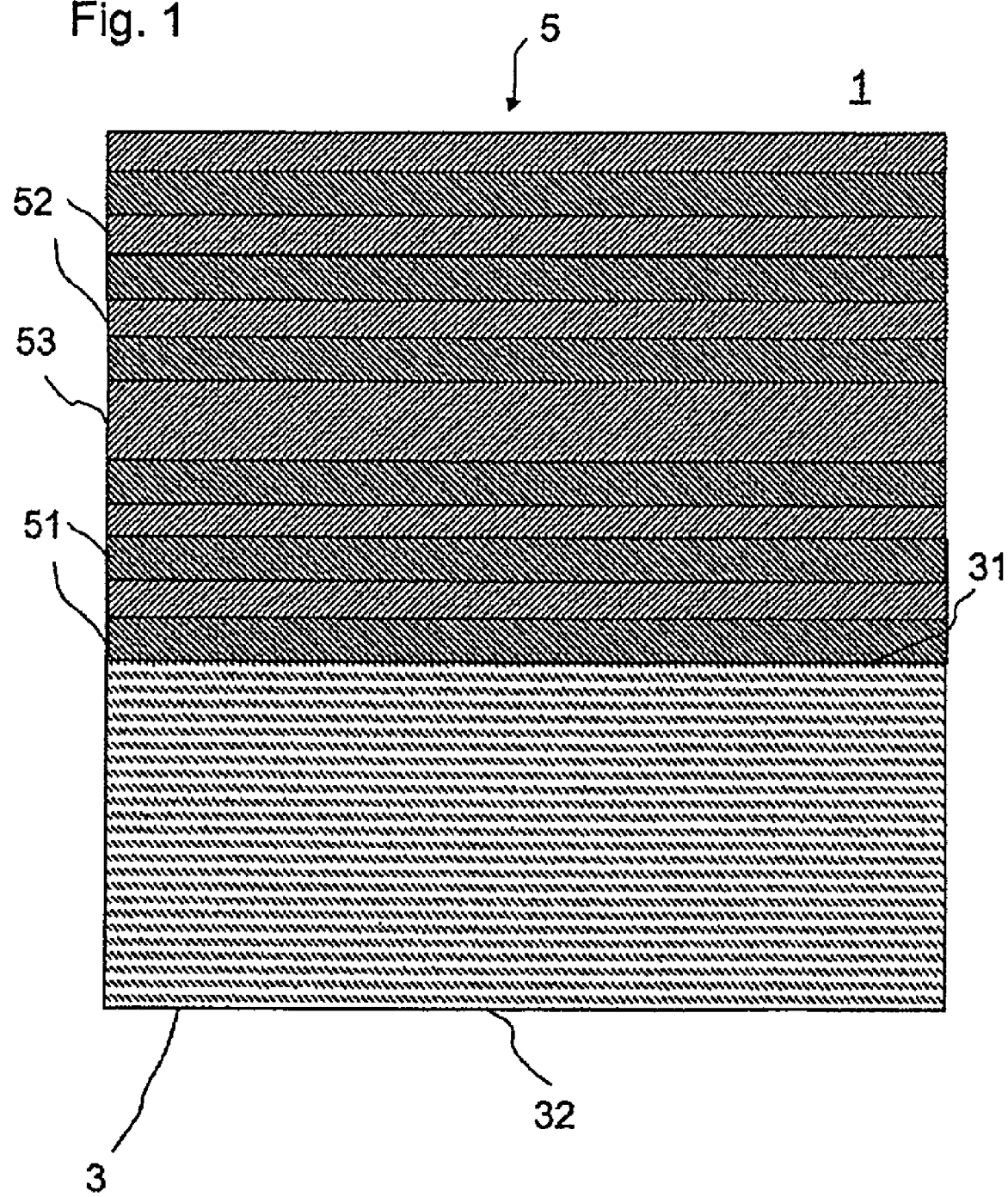
FIG. 1 shows a cross-sectional view through an interference filter such as can be produced according to the invention.

FIG. 1 schematically shows a dielectric transmission interference filter 1 for filtering out the i-line of a mercury vapor lamp. The filter comprises a substrate 3 having sides 31, 32, which substrate is transparent to the i-line, or to light having a wavelength of 365 nanometers. Glass, for example, is suitable as a material for the substrate.

An interference alternating layer system 5 having alternate layers 51, 52 is deposited on the substrate. In this case, layers 51 and layers 52 respectively alternate, wherein the layers 51 have a higher refractive index than the layers 52 and are referred to as layers having a high refractive index for the sake of simplicity below.

The layers 51 having a high refractive index are produced by co-evaporation of $Sb_2O_3$ and $PbF_2$, and the layers 52 having a low refractive index are produced by co-evaporation of $PbF_2$ and $MgF_2$, wherein a dedicated source is used for each of the materials. Generally, electron beam evaporation, in particular, is suitable for depositing the materials having a high melting point. One or a plurality of layers can be provided as spacer or resonator layers in the layer system. The example shown in FIG. 1 has one such layer 53. The one or the plurality of resonator layers have an optical thickness having an odd-numbered multiple of half the design wavelength $\lambda$. The optical thickness of the other layers is in each case an odd-numbered multiple of $\lambda/4$.

The number of layers is preferably greater than in the example shown in FIG. 1, in order that a specific UV line of the spectrum of a vapor lamp can be filtered out as selectively as possible with sufficient narrowband nature. By way of example, the layer system can have 29 layers 51, 52 including three resonator layers 53. A transmission window around the mercury i-line having a full width at half maximum of 12 nanometers can be obtained with such a layer system. Twenty seven layers 51, 52 including two resonator layers 53 are provided in accordance with a further example. It is thus possible to achieve a transmission window having a full width at half maximum of 6 nanometers around the design wavelength of 365 nanometers, in accordance with the wavelength of the mercury i-line.

Figure 2:
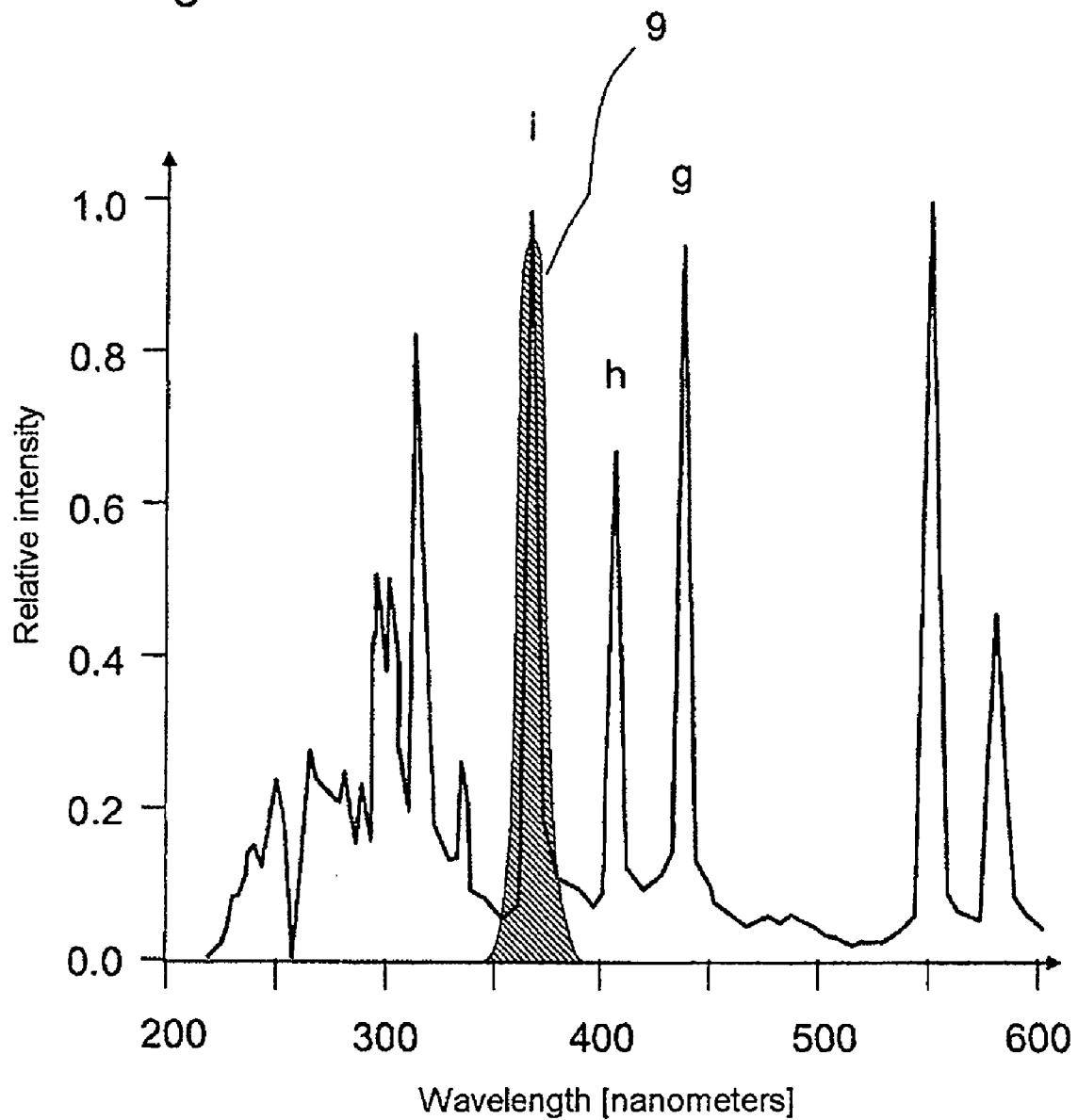
FIG. 2 shows a spectrum of a mercury vapor lamp with a superimposed excerpt from the spectral transmission of an interference filter.

FIG. 2 shows a spectrum of a mercury vapor lamp for clarification purposes. The i-, h- and g-lines of the mercury is spectrum are identified by the corresponding letters. The i-line is particularly suitable for lithography. Accordingly, the g- and h-lines at the wavelength of 436 nanometers and the wavelength of 405 nanometers, respectively, should be shielded as far as possible by the filter. A correspondingly narrowband filtering around a design wavelength in accordance with the i-line is favorable for this purpose. On the other hand, this is associated with the fact that the light intensity of an arrangement having a mercury vapor lamp and such a filter depends very sensitively on the spectral position of the transmission window of the filter.

This also becomes clear from the excerpt from the spectral transmission with the transmission window 9 as depicted in FIG. 2. The window has a full width at half maximum of approximately 12 nanometers, in accordance with the above-described example of a filter having 29 layers. If the central wavelength of the window, that is to say the maximum thereof, and the i-line no longer coincide exactly, a decrease in the light intensity and spectral widening occur very rapidly on account of the folding of the emission line with the form of the window 9. This effect is even more pronounced, of course, in the case of an even narrower band filter with a window having a full width at half maximum of 6 nanometers.

Figure 3:
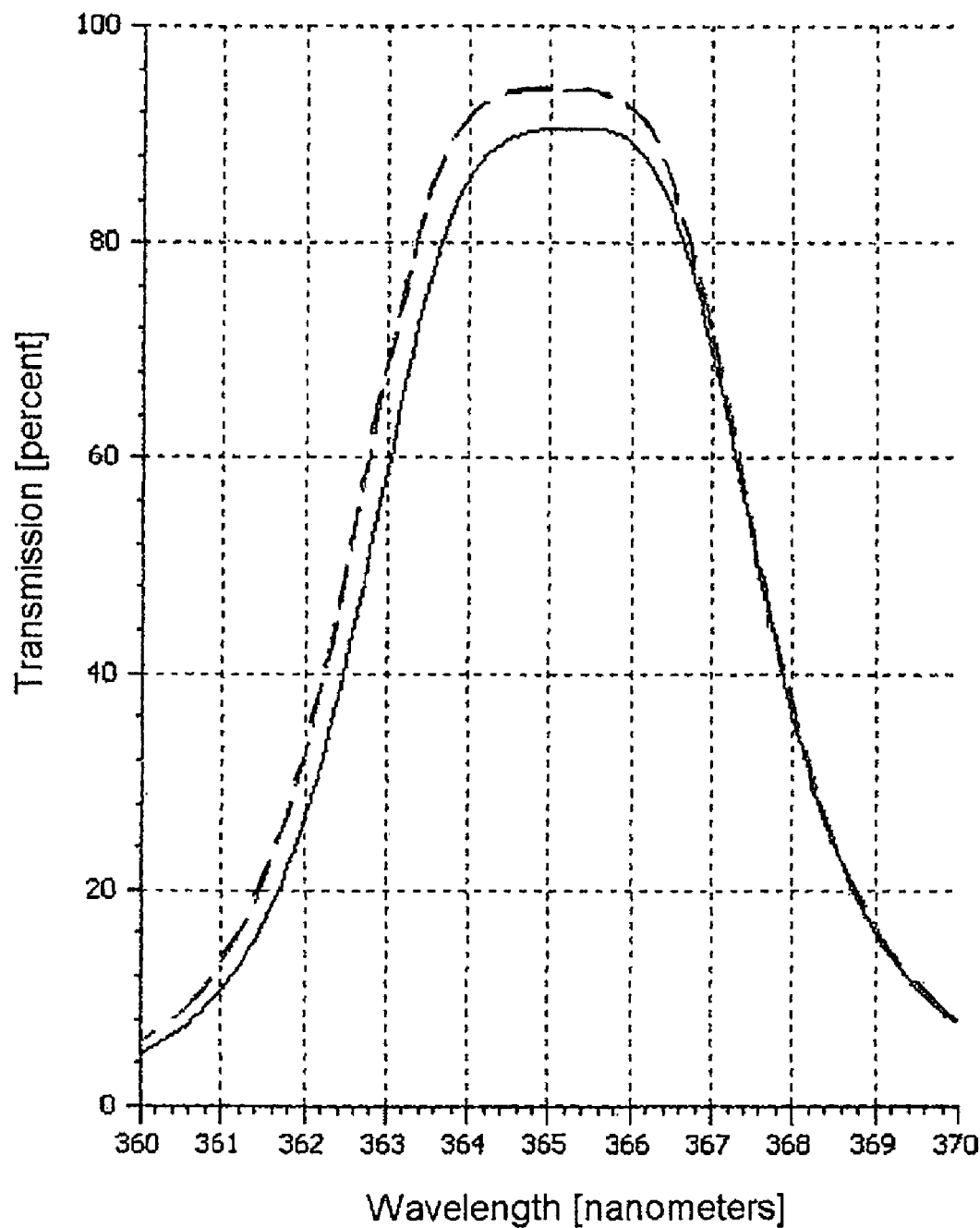
FIG. 3 shows an illustration of the transmission characteristic of a filter produced according to the invention, before and after the aftertreatment by means of heat treatment and UV irradiation.

FIG. 3 shows an illustration of the transmission characteristic of a filter produced according to the invention, before and after the aftertreatment by means of heat treatment and UV irradiation. In this case, the solid curve is the spectral transmission profile of the filter not subjected to aftertreatment, and the curve depicted in a dashed fashion shows the transmission profile of a filter that was subjected to heat treatment and irradiated with UV light. The curves were calculated in each case on the basis of the refractive index changes occurring in the layers having a high refractive index and having a low refractive index. The refractive index in the layers having a high refractive and having a low refractive index increases in different ways in this case. Specifically, an increase by $\Delta n=0.003$ was assumed in the $Sb_2O_2+PbF_2$ layer having a high refractive index and an increase by $\Delta n=0.01$ was assumed in the $MgF_2+PbF_2$ mixed layer having a low refractive index.

The reason for the different increase in the refractive index is that substochiometric lead fluoride $Pb_XF_Y$ is converted into $Pb_aO_bF_c$ in the course of the heat treatment and in particular the UV irradiation and the refractive index increases. This effect also occurs in the magnesium fluoride. Since the material having a high refractive index contains less fluorine, that is to say the migration effect of oxygen to the lead oxide will not be as pronounced as in the case of the material having a low refractive index, the shift in refractive index is also greater.

This relative change in the refractive indices that takes place to different extents possibly also gives rise to a smaller refractive index difference between layer having a high refractive index and layer having a low refractive index, whereby the full width at half maximum of the filter increases somewhat, which should also be observed in practice.

The transmission increase to be observed in practice was simulated in the calculation of the curves shown in FIG. 3 by a reduction of the absorption coefficient after the heat treatment and the UV irradiation.

As can be discerned on the basis of the transmission profiles, the spectral position of the central transmission wavelength—here the average wavelength of the plateau-shaped transmission maximum—is shifted toward longer wavelengths by approximately 0.2 nanometer on account of the refractive index changes of the individual layers.

In the case of the layer thicknesses of the layers, therefore, in general without restriction to the example of FIG. 3, a corresponding margin is set such that the desired central transmission wavelength is achieved after the heat treatment and the UV irradiation. In the example shown in FIG. 3, and also in a preferred embodiment of the invention, this is a wavelength of 365 nanometers, or the i-line of the spectrum of a mercury vapor lamp.

Figure 4:
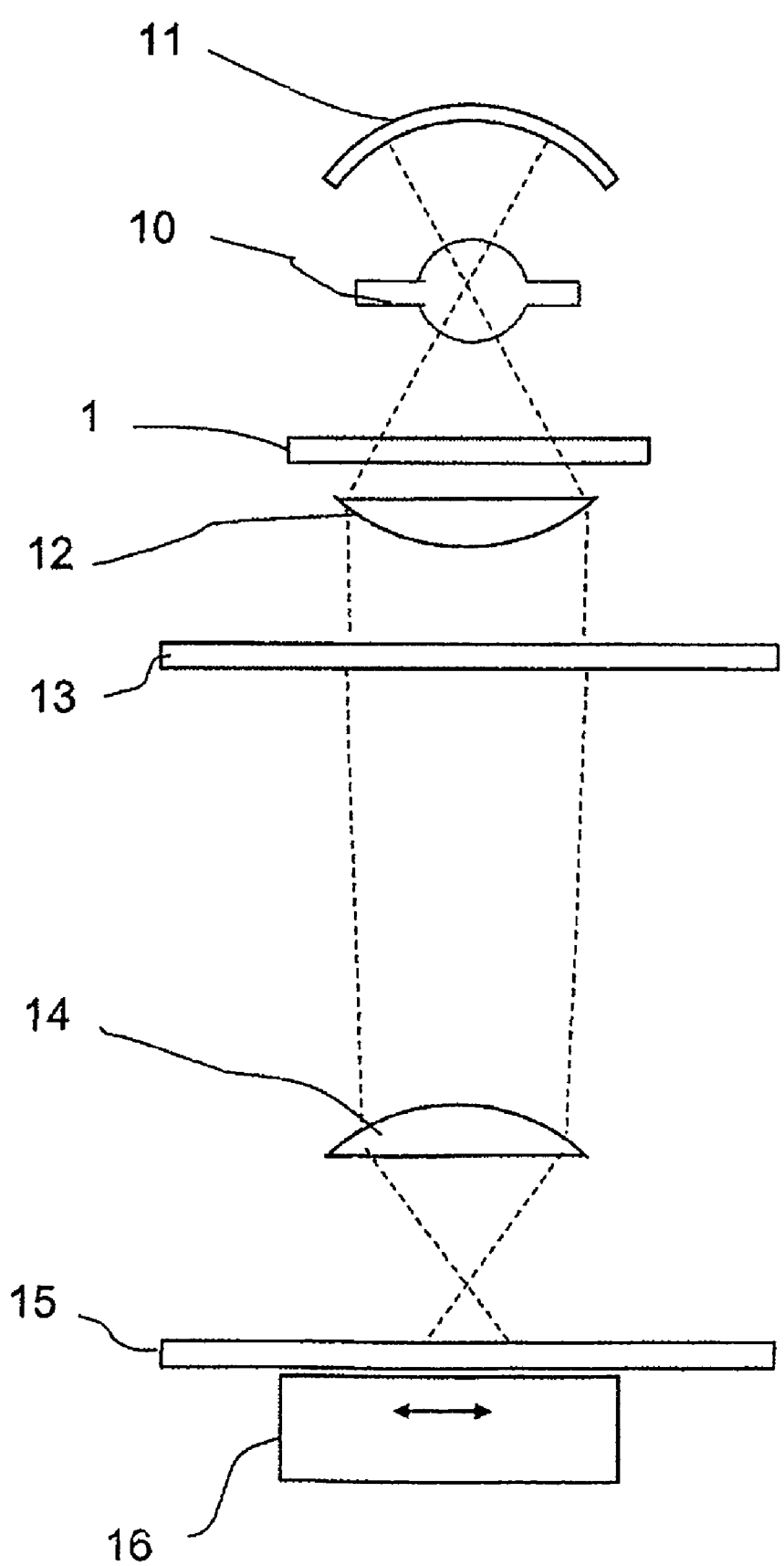
FIG. 4 shows a schematic view of a stepper for the exposure of wafers with a filter such as is illustrated by way of example in FIG. 1.

FIG. 4 shows a schematic view of a wafer stepper for which the interference filters are produced according to the invention find a preferred use. The stepper comprises a mercury vapor lamp 10, which emits light with a spectrum as illustrated in FIG. 2. A concave mirror 11 reflects back light emitted on the rear side with respect to the optical path. The light is filtered by means of an interference filter 1 produced according to the invention, such that essentially only light of the i-line of the mercury is present downstream of the interference filter 1.

The light is collected by means of a condenser lens 12 and passes through a mask 13 having the pattern to be transferred to the photoresist layer on a wafer 15. By means of a demagnifying lens 14, the image of the mask 13 is then imaged on the wafer 15 in demagnified fashion. By means of a stepper unit 16, the wafer 15 is moved stepwise in the image plane, such that different regions of the wafer 15 are exposed successively.

It is evident to the person skilled in the art that the invention is not restricted to the merely illustrative exemplary embodiments described above, but rather can be varied in diverse ways. In particular, the individual features of the exemplary embodiments can also be combined with one another.

What is claimed is:

1. A method for producing a dielectric transmission interference filter, the method comprising:
    disposing a substrate in an evaporation chamber;
    alternately depositing layers having a first refractive index and a second refractive index on the substrate, the first refractive index being higher than the second refractive index, wherein the layers are in each case produced by co-evaporation of at least two of the constituents magnesium fluoride, lead fluoride and antimony oxide, and wherein a total of at least 15 layers are deposited one on top of another; and
    after the deposition of the layers, subjecting the substrate to heat treatment at a temperature of at least 50° C. and irradiating the substrate with ultraviolet (UV) light, wherein there is a decrease in the central wavelength of the transmission window in the transmission of the filter for the central transmission wavelength within a spectral transmission window in the course of irradiation, such that the filter has a transmission window around a wavelength of 365 nanometers after the UV irradiation.

2. The method as claimed in claim 1, wherein the deposition of the layers having a second refractive index comprises the evaporation of magnesium fluoride and lead fluoride and the deposition of the layers having a first refractive index comprises the evaporation of lead fluoride and antimony oxide, such that the layers having a second refractive index contain a mixture of magnesium fluoride and lead fluoride and the layers having a first refractive index contain a mixture of lead fluoride and antimony oxide.

3. The method as claimed in claim 1, wherein the deposition of the layers having a second refractive index comprises the evaporation of magnesium fluoride and antimony oxide and the deposition of the layers having a first refractive index comprises the evaporation of lead fluoride and antimony oxide, such that the layers having a second refractive index contain a mixture of magnesium fluoride and antimony oxide and the layers having a first refractive index contain a mixture of lead fluoride and antimony oxide.

4. The method as claimed in claim 1, wherein during the heat treatment and the irradiating of the substrate with UV light, the layers are subjected to oxygen post-loading.

5. The method as claimed in claim 1, wherein the transmission window has, after the UV irradiation, a spectral position whose longer-wave edge lies at a wavelength of less than 450 nanometers.

6. The method as claimed in claim 1, wherein the transmission maximum has a full width at half maximum of at most 20 nanometers.

7. The method as claimed in claim 1, wherein the substrate with alternately-deposited layers is irradiated with UV light for a duration of at least 5 hours.

8. The method as claimed in claim 1, wherein the irradiation is effected by means of a mercury vapor lamp or a lamp which emits UV light at a wavelength of 365 nanometers.

9. The method as claimed in claim 1, wherein the substrate is subjected to heat treatment for at least twelve hours after the deposition of the layers.

10. The method as claimed in claim 1, wherein the substrate is subjected to heat treatment at temperatures of less than 250° C.

11. The method as claimed in claim 1, wherein a substrate area having a lateral dimension or a diameter of at least 100 millimeters is coated.

12. A method for producing a dielectric interference filter, the method comprising:

disposing a substrate in an evaporation chamber;

alternately depositing layers having a first refractive index and a second refractive index on the substrate, the first refractive index being higher than the second refractive index, wherein a total of at least 15 layers are deposited one on top of another;

wherein an alternating layer system is deposited, wherein the alternating layer system comprises alternate first and second layers having a different composition of the constituents antimony oxide, magnesium fluoride and lead fluoride; and after the deposition, shifting the central wavelength of a transmission or reflection window toward shorter wavelengths in the direction of the design wavelength based on the coated substrate being subjected to heat treatment and irradiated with ultraviolet (UV) light, such that the filter has a transmission window around a wavelength of 365 nanometers after the UV irradiation.

13. The method as claimed in claim 12, wherein the central wavelength of the transmission window is shifted toward shorter wavelengths by at least 0.1 nanometer during the heat treatment and UV irradiation.

14. An intermediate product for producing a dielectric ultraviolet (UV) interference filter, comprising a substrate and, deposited thereon, an alternating layer system having alternate first and second layers having a different composition of the constituents antimony oxide, magnesium fluoride and lead fluoride, wherein a total of at least 15 layers are deposited one on top of another, wherein the layer thicknesses of the layers are a multiple of a quarter of a design wavelength, and wherein, by means of heat treatment and UV irradiation, a shift in the central wavelength of a transmission or reflection window in the direction of the design wavelength proceeding from a longer wavelength than the design wavelength is effected, such that the filter has a transmission window around a wavelength of 365 nanometers after the UV irradiation.

* * * * *